United States Patent [19]

Haselbauer et al.

[11] 4,249,706
[45] Feb. 10, 1981

[54] OPEN FACE SPINNING REEL

[76] Inventors: Gene R. Haselbauer, 10907 NE. 8 Ave., Biscayne Park, Fla. 33161; Bert Freeman, 96 W. Grant Ct., Highland, Mich. 48031

[21] Appl. No.: 6,259
[22] Filed: Jan. 23, 1979
[51] Int. Cl.³ .............................................. A01K 89/01
[52] U.S. Cl. ........................................... 242/84.21 R
[58] Field of Search ..................... 242/84.21 R, 84.2 R

[56] References Cited
U.S. PATENT DOCUMENTS 3,351,301  11/1967  Bretton ........................ 242/84.21 R
3,788,570  1/1974  Yamazaki et al. ............ 242/84.21 R

FOREIGN PATENT DOCUMENTS 265430  3/1950  Switzerland ..................... 242/84.21 R Primary Examiner—Billy S. Taylor

[57] ABSTRACT

An improved open face spinning reel including a conventional spinning reel with a head spanned by conventional bail, the head including a spool and a conventional shaft, the shaft having an upper end which is journaled for rotation in the head with the spool such that the shaft freely rotates with the spool and a conventional housing adjacent the head containing the shaft. The shaft includes a lower end having a swivel such that when the spool is turned the shaft reciprocates allowing the line to be thread evenly over the spool. The improvement comprises a spring-loaded means for engaging and disengaging the shaft. The spring-loaded means is fixably mounted through the conventional housing such that the means can move slidably back and forth to engage and disengage the shaft.

7 Claims, 5 Drawing Figures

U.S. Patent      Feb. 10, 1981      4,249,706
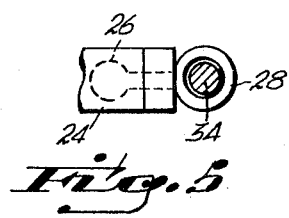
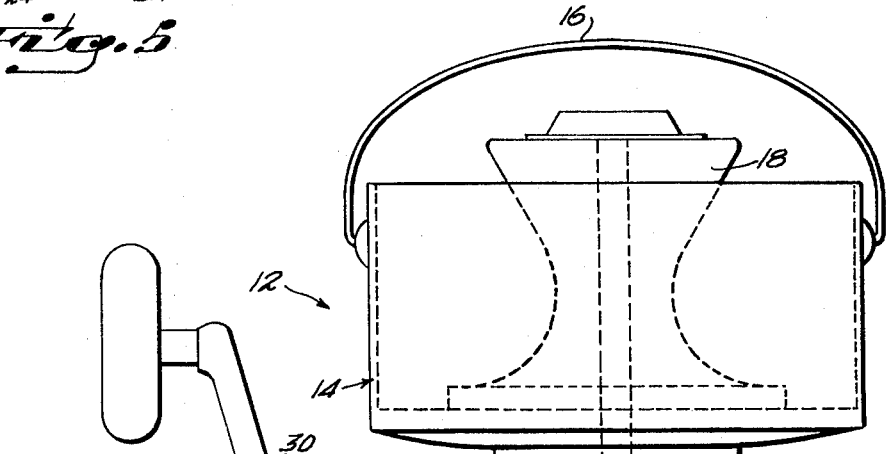
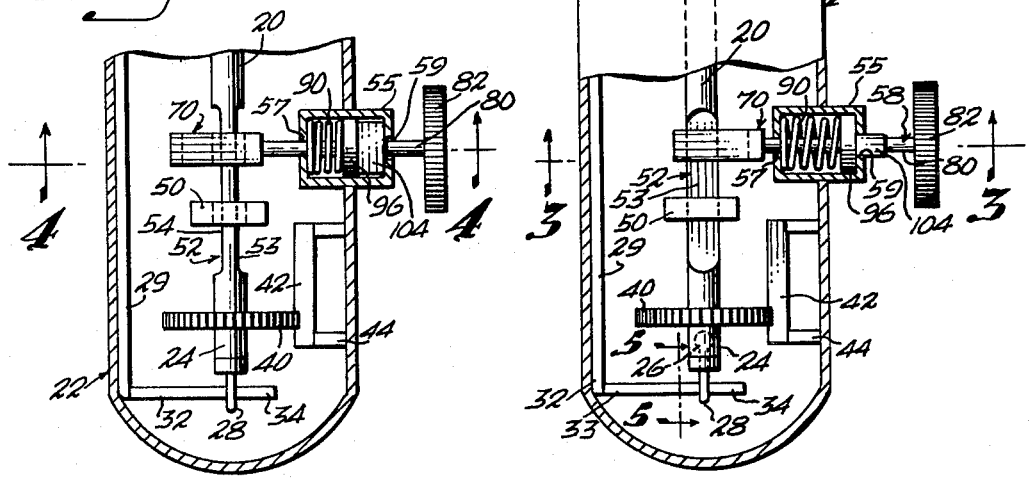

OPEN FACE SPINNING REEL

FIELD OF THE INVENTION

This invention relates to spinning reels and more particularly to open face spinning reels wherein the shaft and spool are keyed for rotation together.

OBJECTS OF THE INVENTION

It is an object of this invention to provide a spinning reel so constructed as to allow the spool to rotate freely without having to loosen, i.e., readjust, the drag.

It is also an object of this invention to provide a spinning reel which is so constructed that, while the spool is rotating freely, in the depressed position, a gear, solidly fixed to the rotating shaft, strikes against a flexible member permanently fixed to the inside of the housing preventing line back lash and alerting the user with a loud clicking noise.

It is also an object of this invention to provide a spinning reel which includes structure to present the drag, according to line strength, without the need to readjust it to attain proper drag pressures to set a hook.

It is also an object to provide a spinning reel of a standard open face type with a means to allow the spool to rotate other than by conventional drag means, the latter being standard.

BACKGROUND OF THE INVENTION

In the past standard open face spinning reels have included a head with a bracket in which a spool is journaled for rotation about a shaft which is ordinarily fixed so that the spool spins on the shaft and may be restrained by a braking mechanism to increase or decrease the drag as line is pulled from a spool rotating on the shaft; however, as is conventional, the shaft is free to reciprocate axially to distribute the line evenly over the spool when it is reeled in. This invention is of a somewhat different structure in that the shaft and spool are keyed for rotation together. The problem with the prior art conventional reels has been that when a fish strikes and takes the line there is, first, no warning and, second, the drag must be preset or adjusted after the fish strikes. If the drag has been preset and is too much then, in some circumstances, the pole, which is quite expensive, and the entire reel may be lost. On the other hand, if the drag is set too loosely, the fish takes the line which plays out quite freely and, quickly, but without a warning, the user must adjust the drag while the fish is running with the line in order to make the drag tight enough to set the hook. In use, when the drag is being adjusted on the prior art conventional reels, as it must be, one hand only can hold the pole while the other must be used to manipulate the drag, which is a disadvantage to say nothing of the fact that the fish cannot be reeled in while the adjustment of the drag takes place.

This invention provides structure which has a warning and the spool is free-spinning, initially, and, in response to the warning, the user engages a locking mechanism which stops the spool and shaft, which are keyed together from free-spinning and is adapted to be moved into engagement with the spinning shaft to lock it in a fixed position so that the only restraining influence on the spool is a preset or predetermined amount of drag.

DESCRIPTION OF THE PREFERRED EMBODIMENT

Referring to the drawings wherein like reference characters designate like or corresponding parts throughout the several views there is shown an improved open face spinning reel generally designated by the numeral 12 which includes a head 14 spanned by a conventional bail 16 and on which there is a spool 18 journaled for rotation with respect to the bracket and which includes a shaft 20 which extends into a housing 22. The end 24 of the shaft 20 is provided with a swivel 26 having an axially extending loop 28. As is conventional, a cam 29 which is slidably arranged with respect to the housing is provided so that when the crank 30 is turned, it moves parallel to the axis of the shaft 20 in a reciprocating motion. The lower end 32 of the cam is provided with a offset rod 33 having an end zone 34 which passes through the loop 28. Thus, as is conventional, in use when the crank arm 30 is turned, the shaft 20 reciprocates axially; however, the swivel does not turn because it is fixed against rotation by the end of the rod 32. It is thus seen that the shaft 20 is free to rotate with the spool. As is conventional, the head includes a braking mechanism to adjust the amount of drag on the spool against the shaft, which comprises no part of this invention.

It is thus seen that when the spool rotates rapidly as when a fish strikes, the shaft will, simultaneously, rotate rapidly when the bail is in a closed position.

Keyed on the shaft there is a ratchet device 40 with peripheral teeth which are arranged so as to engage a yieldably mounted member 42 connnected to the housing 22 by suitable means such as the pegs 44. Thus, when the shaft rotates noise is generated by the clicking of the teeth on the member 42. With respect to the intermediate length of the shaft or at a suitable location along the shaft, there is a shaft guide or bushing with respect to which the shaft is maintained in alignment with the spool and housing, this bushing being designated by the numeral 50.

Means are provided to engage and disengage the shaft to restrain it from free rotation whenever desired and which will now be described. The intermediate zone of the shaft is provided with a flattened section 52, presenting two flattened sides 53 and 54. Fixed to the housing a locking box 55 is provided which has an opening 57 in the inner end and an opening in the form of a slot 59 in the outer end. Through these openings, 57 and 59, a locking rod 58 extends having an enlarged inner end 70, to be described hereinafter, and an outer end 80 to which a locking knob 82 is fixedly arranged. Captivated within the lock box a coil spring 90 is provided which, at its inner end bears against the inner end of the box and at its outer end bears against a keeper disc 96.

As seen in FIG. 3, when the locking rod 58 is in the position there shown, the shaft 20 is locked against rotation within the slit portion 102 of the keyhole shaped opening 103.

By turning the locking knob 82 and locking shaft 58, after it is depressed axially as seen in FIGS. 2 and 4, the keeper disc, 96, which carries a block 104 disengages from the slot 59 which causes the locking rod 58 to move inwardly with the result that the shaft is permitted to rotate within the circular part 101 of the keyhole opening 103.

By reversing the positions of the circular and slit portions 101 and 102, the shaft 20 will be locked against rotation with the locking knob 82 in an out position, and free to rotate in the depressed position thereof.

What is claimed:

1. An improved open face spinning reel comprising:
   a spinning reel having a head portion including an interior spanned by a winding means and an exterior including drive means and a housing portion defining a housing,
   a shaft reciprocally mounted in said portions and said drive means being adapted to rotate said winding means and reciprocate the shaft, the shaft including a lower end having a swivel whereby when the drive means turns the spool the shaft reciprocates allowing a line to be evenly distributed on said spool, and
   means on the housing for locking and preventing rotation of the shaft comprising a locking member having a first end, the first end including a first and second zone, said first zone comprising a locking zone and a second zone comprising an open zone, whereby the shaft will not turn in the first zone but will freely turn in the second zone, the locking member having a second end including an operator for engaging and disengaging the first and second first zones and the locking means having a middle portion fixedly mounted to the housing and including spring means normally urging the first end into a locked position with the shaft for preventing rotation therewith.

2. The device as set forth in claim 1 wherein the shaft includes an intermediate flat zone and the means for releasably locking the shaft from rotation is mounted adjacent the flat zone.

3. The device as set forth in claim 2 wherein the shaft includes two sides and a middle portion, the two sides being flattened.

4. The device as set forth in claim 3 wherein the spring-loaded means for engaging and disengaging the intermediate flat zone of the shaft comprises:
   a locking box fixably connected to the housing adjacent the intermediate flat zone of the shaft, the locking box includes an inner and an outer end and defines two openings, an inner and an outer opening,
   a locking rod extending through the inner and outer openings of the locking box with a keeper disc fixably located on the locking rod and within the locking box adjacent the outer end opening of the locking box,
   the locking rod includes an enlarged end and an outer end which is fixably connected to the operator,
   the enlarged outer end of the locking rod defines a keyhole opening with a circular inner portion and a slot-like outer portion, the shaft of the conventional spinning reel extends through the circular outer portion such that the keyhole opening surrounds the rod,
   a spring captivated within the locking box with one end bearing against the inner end of the box and the other end bearing against the keeper disc,
   when the operator is pushed toward the shaft and rotated to lock in place, the locking rod is forced against the spring tension normally urging the locking rod away from the shaft, the locking rod's extended end then is aligned with the circular portion of the keyhole opening of the enlarged end of the rod such that the shaft is free to rotate within the housing,
   when the operator is turned in the opposite direction, the forces of the spring causes the keeper ring to be moved away from the shaft such that the entire locking rod moves in that direction thereby causing the slot portion of the keyhole opening of the enlarged end of the locking rod to be aligned with the intermediate flat zone of the shaft and restrain the shaft from rotation.

5. The device as recited in claim 4 wherein the outer end of the locking box aligns a slot-like outer opening.

6. The device as recited in claim 5 wherein the spring in the locking box is a coil spring.

7. The device as recited in claim 6 wherein the operator contains a locking means.

* * * * *